United States Patent
Muran et al.

(10) Patent No.: US 9,371,916 B2
(45) Date of Patent: Jun. 21, 2016

(54) SEGMENTED VALVE PACKING GLAND

(71) Applicants: John W. Muran, Reno, NV (US); John Kelley, Reno, NV (US)

(72) Inventors: John W. Muran, Reno, NV (US); John Kelley, Reno, NV (US)

(73) Assignee: Pentair Flow Services AG, Schaffhausen (CH)

( * ) Notice: Subject to any disclaimer, the term of this patent is extended or adjusted under 35 U.S.C. 154(b) by 75 days.

(21) Appl. No.: 14/019,450

(22) Filed: Sep. 5, 2013

(65) Prior Publication Data

US 2014/0061521 A1    Mar. 6, 2014

Related U.S. Application Data

(60) Provisional application No. 61/697,661, filed on Sep. 6, 2012.

(51) Int. Cl.
   *F16K 3/02* (2006.01)
   *F16K 3/20* (2006.01)

(52) U.S. Cl.
   CPC ............ *F16K 3/0281* (2013.01); *F16K 3/0227* (2013.01); *F16K 3/207* (2013.01)

(58) Field of Classification Search
   CPC ..... F16K 3/0227; F16K 3/0281; F16K 3/207; F16J 15/188; F16J 15/184; F16J 15/18
   USPC ................. 251/171, 328, 326, 327, 329, 214
   See application file for complete search history.

(56) References Cited

U.S. PATENT DOCUMENTS

| | | | |
|---|---|---|---|
| 2,891,762 A * | 6/1959 | Kellogg | 251/327 |
| 3,658,084 A | 4/1972 | Hastings et al. | |
| 4,328,974 A | 5/1982 | White et al. | |
| 4,468,039 A | 8/1984 | Le et al. | |
| 4,881,719 A * | 11/1989 | Bowman | 251/328 |
| 5,082,247 A * | 1/1992 | Owens et al. | 251/326 |
| 5,979,874 A * | 11/1999 | Gambetta et al. | 251/328 |
| 6,116,573 A * | 9/2000 | Cornette | F16K 41/02 251/214 |
| 6,422,535 B1 * | 7/2002 | Stone et al. | 251/327 |
| 6,588,729 B1 * | 7/2003 | Kimpel | 251/214 |
| 6,959,912 B2 * | 11/2005 | Reeves et al. | 251/214 |
| 2009/0121173 A1 | 5/2009 | Devine, Jr. et al. | |

FOREIGN PATENT DOCUMENTS

CN    2483566 Y    3/2002

OTHER PUBLICATIONS

Notice of Transmittal, PCT Search Report and Written Opinion under date of mailing of Feb. 3, 2014 in connection with PCT/US2013/058327.

* cited by examiner

*Primary Examiner* — John Bastianelli
*Assistant Examiner* — Andrew J Rost
(74) *Attorney, Agent, or Firm* — Quarles & Brady LLP

(57) ABSTRACT

A packing gland for a valve wherein the packing gland includes a top portion for receiving a gate. The packing gland includes first and second longitudinal sections of packing material for sealing the gate. In addition, the packing gland includes first and second stuffer elements located adjacent the first and second longitudinal portions. The packing gland also includes a plurality of clamp elements located adjacent the first and second stuffer elements, wherein the clamp elements provide pressure on selected portions of the first and second stuffer elements to compress corresponding selected portions of the first and second longitudinal sections of packing material.

12 Claims, 5 Drawing Sheets

SEGMENTED VALVE PACKING GLAND

RELATED APPLICATIONS

This application claims priority under 35 U.S.C. §119 to U.S. Provisional Patent Application No. 61/697,661 filed on Sep. 6, 2012, the entire contents of which are incorporated herein by reference.

FIELD OF THE INVENTION

This invention relates to packing gland for a knife gate valve, and more particularly, a segmented packing gland having a plurality of clamp elements for compressing portions of packing material in a knife gate valve.

BACKGROUND OF THE INVENTION

On non-bonneted knife gate valves, multiple rows of packing material are placed around a gate and then compressed with a packing gland. This configuration forms a substantially liquid tight seal in order to hinder fluid leakage. Current packing glands are configured as a single piece structure that surrounds the gate. However, when a knife gate valve sized for a relatively large pipe is used, the packing area substantially increases. Further, typical manufacturing and assembly tolerances cause the geometry of a packing box to vary thus causing corresponding variations in packing height.

As a result, current packing glands have several disadvantages when used with relatively large valves. A disadvantage is that the packing gland has to be relatively large and structurally robust and heavy in order to be able to accommodate the increased size of the packing area and the forces required to suitably compress the packing material. In addition, the packing gland cannot be removed for maintenance operations, such as re-packing the valve, without disconnecting a valve actuator system. Further, the packing gland is not able to provide uniform pressure on the packing material if the packing height varies. In use, the packing material is compressed by tightening the packing gland until no leakage occurs. However, this leads to over tightening in some locations, thus reducing the life of the packing material and increasing valve thrust.

SUMMARY OF THE INVENTION

A packing gland for a valve is disclosed wherein the packing gland includes a top portion for receiving a gate. The packing gland includes first and second longitudinal sections of packing material for sealing the gate. In addition, the packing gland includes first and second stuffer elements located adjacent the first and second longitudinal portions. The packing gland also includes a plurality of clamp elements located adjacent the first and second stuffer elements, wherein the plurality of clamp elements provide pressure on selected portions of the first and second stuffer elements to compress corresponding selected portions of the first and second longitudinal sections of packing material.

DESCRIPTION OF THE INVENTION

Figure 1:
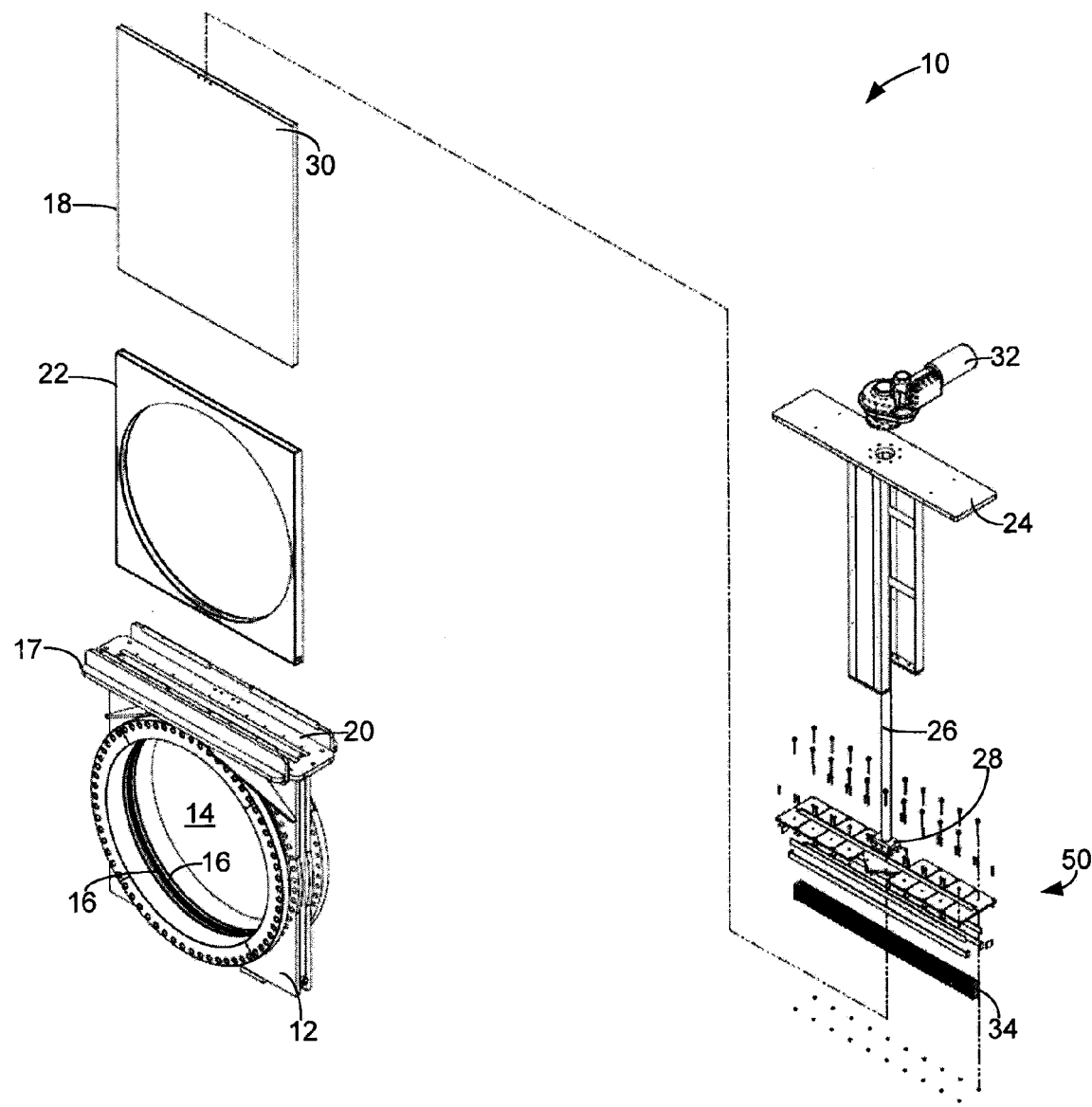
FIG. 1 is an exploded view of a knife gate valve having a segmented valve packing gland in accordance with the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-5.

Referring to FIG. 1, an exploded view of a knife gate valve 10 having a segmented valve packing gland 50 is shown. Valve 10 includes a body 12 having a generally circular passageway 14 for enabling fluid flow between conduits or pipes that are attached to the valve 10 during use. The body 12 further includes spaced apart O-rings 16 that are located circumferentially around the passageway 14. A top portion 17 of the body 12 includes a substantially rectangular shaped first aperture 20 for receiving a gate 18 that is moveable between closed and open positions. In the closed position, the gate 18 is moved into the passageway 14 thus blocking the passageway 14 and stopping fluid flow. In this position, the gate 18 is received between the O-rings 16 thereby sealingly engaging the gate 18 to hinder fluid leakage between the gate 18 and body 12. In the open position, the gate 18 is moved out of the passageway 14 thus opening the passageway 14 and enabling fluid flow. The gate 18 moves within a protective liner 22 located within the body 12 which may be fabricated from polypropylene or other suitable material such as ultra-high-molecular-weight polyethylene (i.e. UHMW), polytetrafluoroethylene (i.e. Teflon® coating) and others and serves to prevent metal to metal contact between the gate 18 and the body 12 to thereby protect the gate 18.

The valve 10 further includes a yoke 24 secured to the upper portion 17 and a valve stem 26 that extends through the yoke 24. A lower portion 28 of the valve stem 26 is secured to an upper end 30 of gate 18. A portion of the valve stem 26 is threaded and is threadably engaged with an actuator 32. The actuator 32 contains a stem nut that is rotatable. As the stem nut is rotated, the valve stem 26 remains static. The rotation of the stem nut in either the clockwise or counterclockwise direction causes gate 18 to move between the open and closed positions.

Figure 2:
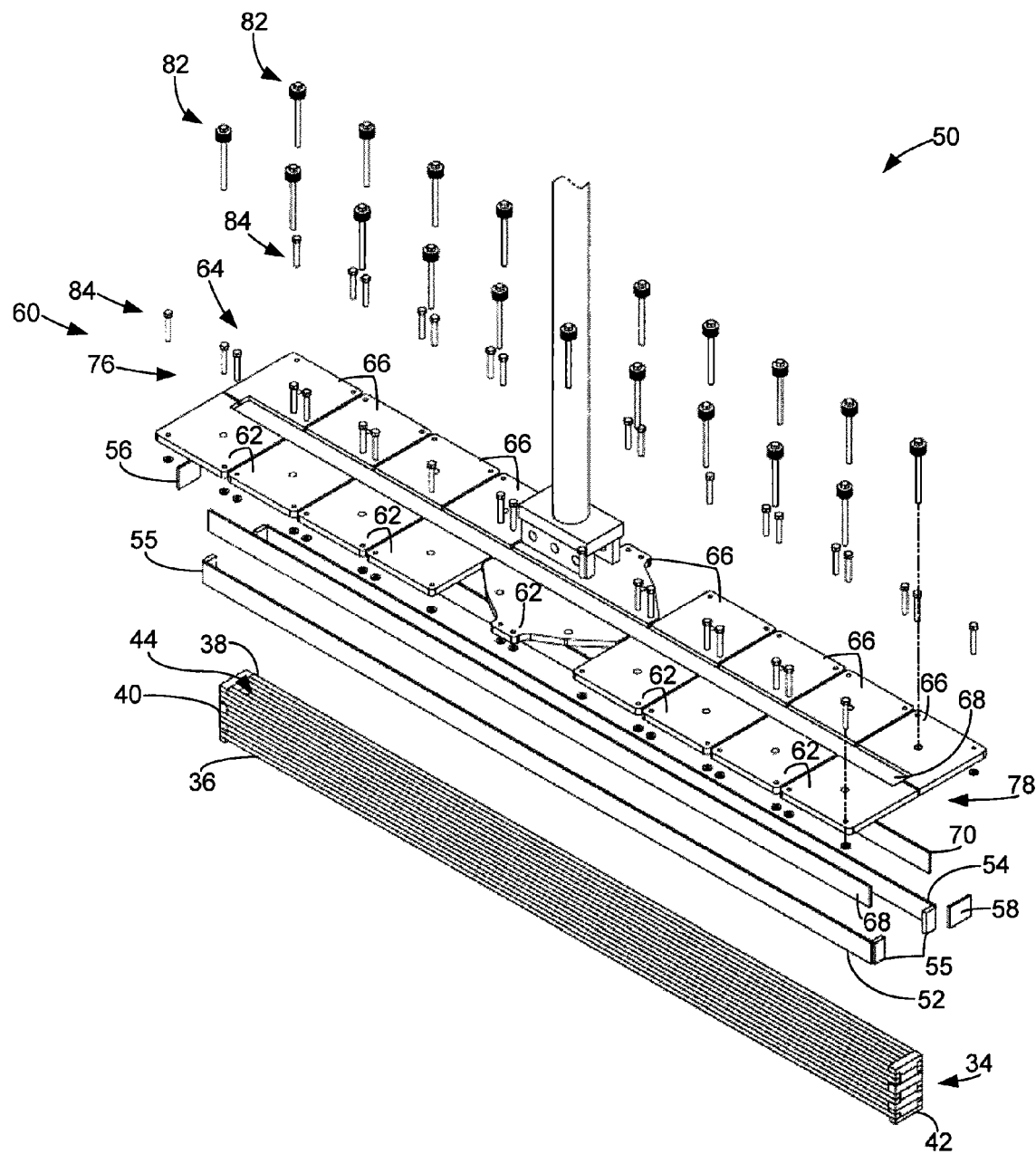
FIG. 2 is an enlarged view of the packing gland.

The first aperture 20 includes packing material 34 that is fabricated from a resilient material. Referring to FIG. 2, an enlarged view of the packing gland 50 is shown. The packing material 34 has a substantially rectangular shape and includes first 36 and second 38 longitudinal side sections and first 40 and second 42 end sections which form a channel 44. The gate 18 moves within the channel 44 and slides against the first 36 and second 38 side sections and the first 40 and second 42 end sections as the gate 18 moves between the open and closed positions. The packing material 34 serves to seal the gate 18 as the gate 18 moves in order to inhibit fluid leakage during use. The packing material 34 may be fabricated from a polytetrafluoroethylene (PTFE) food grade material or other suitable material having a braided or other configuration.

The packing gland 50 further includes vertically oriented first 52 and second 54 longitudinal stuffer side elements and first 56 and second 58 stuffer end elements which are associated with the first 36 and second 38 side sections and the first 40 and second 42 end sections, respectively, of the packing material 34. The first 52 and second 54 stuffer side elements also include a transverse portion 55 associated with the first 40 and second 42 end sections of the packing material 34. In addition, the packing gland 50 includes a plurality of first 62 and second 66 clamp elements arranged in first 60 and second 64 rows thus forming a segmented packing gland arrangement. In one embodiment, the first 60 and second 64 rows each include nine clamp elements. The first 62 and second 66 clamp elements are located above the first 52 and second 54 stuffer side elements and first 56 and second 58 stuffer end elements, respectively. The first 62 and second 66 clamp elements each include recessed portions which together form a second aperture 68 for receiving the gate 18.

Figure 3:
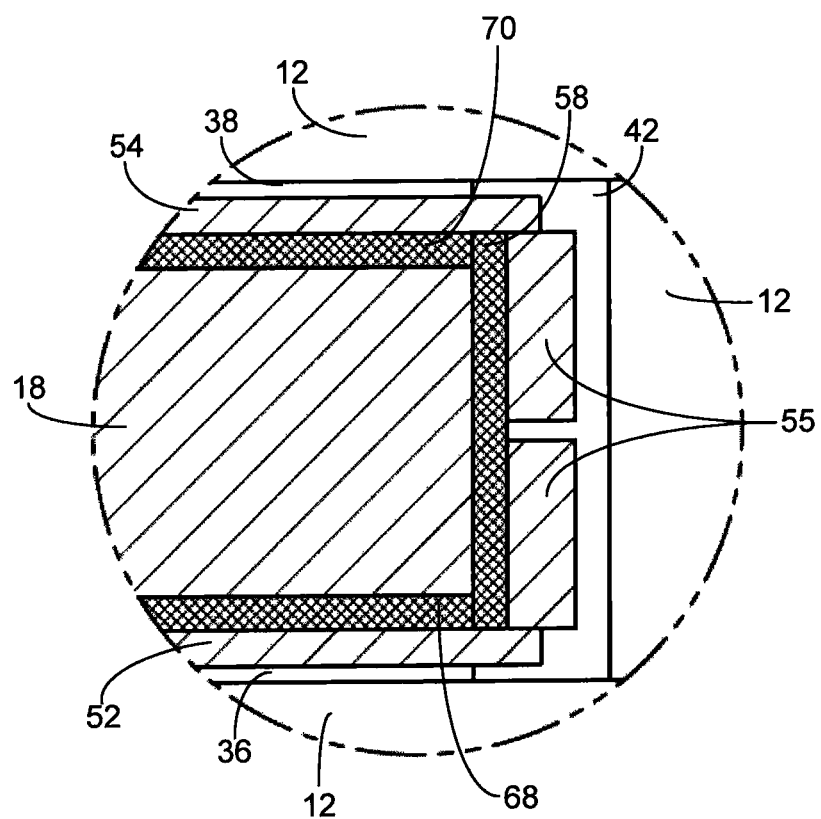
FIG. 3 is a cross sectional view of the gate and packing material.

Referring to FIG. 3, the gate 18 is shown located within packing material 34. When inserted into the packing material 34, gate 18 is bounded by spacer side 68, 70 and spacer end 56, 58 elements. In turn, the spacer side 68, 70 and spacer end 56, 58 elements are bounded by stuffer side 52, 54 elements and transverse portions 55. The stuffer side 52, 54 elements and transverse portions 55 are then bounded by the first 36 and second 38 side sections and the first 40 and second 42 end sections, respectively, of the packing material 34.

Figure 4:
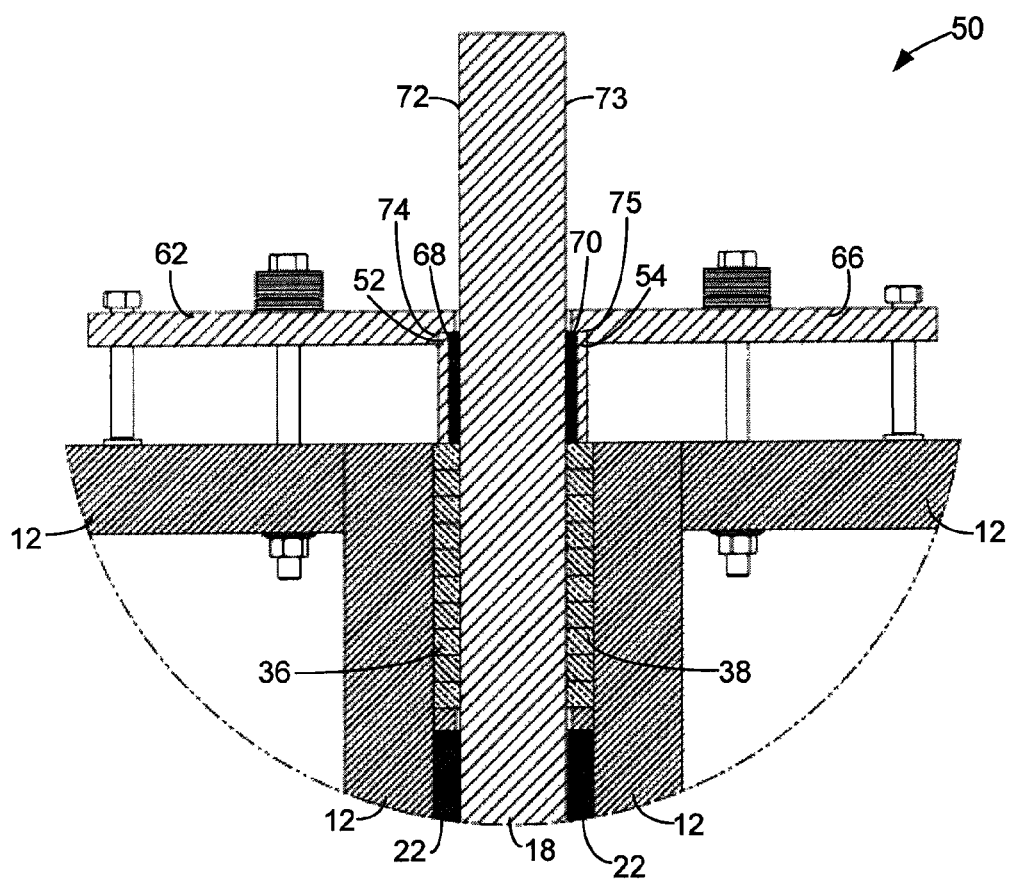
FIG. 4 is a cross sectional view of the packing gland.
Figure 5:
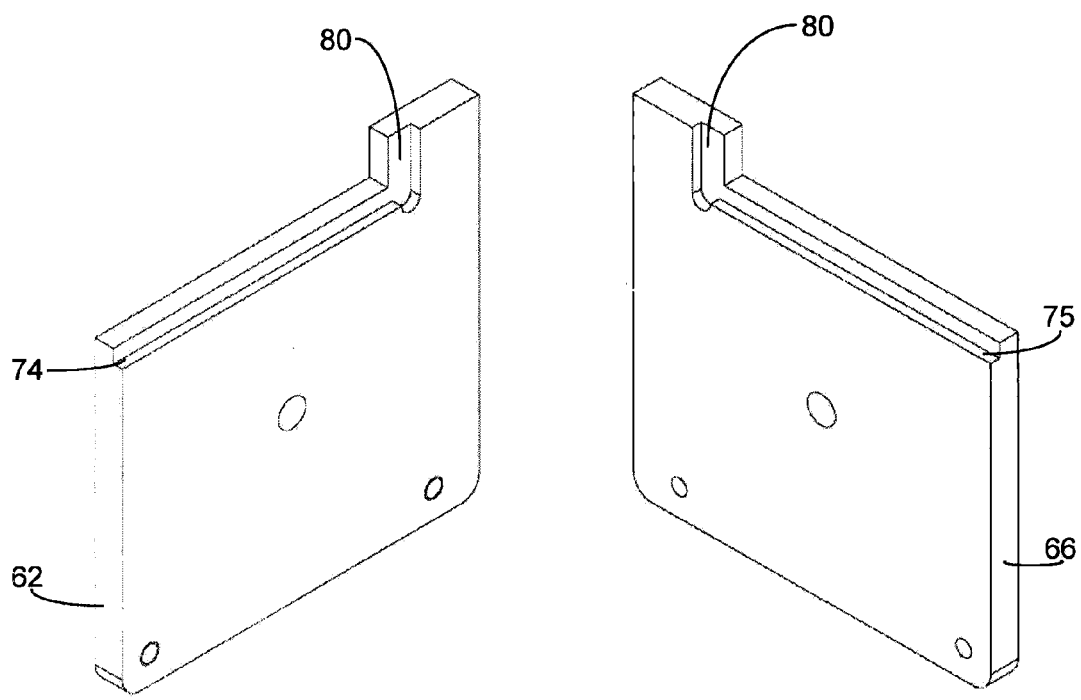
FIG. 5 is view of a second notch formed in clamp elements located at first and second ends of first and second rows of clamp elements.

Referring to FIG. 4, a cross sectional view of the packing gland 50 is shown. A first spacer 68 is located between a first 72 side surface of the gate 18 and the first stuffer element 52. Similarly, a second spacer 70 is located between a second side surface 73 of the gate 18 and the second stuffer element 54. The first 68 and second 70 spacers may be fabricated from UHMW or other suitable material and serve to prevent contact between the gate 18 and the first 52 and second 54 stuffer side elements, the first 56 and second 58 stuffer end elements (not shown) and the first 62 and second 66 clamp elements.

The first 62 and 66 second clamp elements include first 74 and second 75 notches, respectively. The first notch 74 receives portions of the first stuffer element 52 and the first spacer 68. The second notch 75 receives portions of the second stuffer element 54 and the second spacer 75. In addition, clamp elements 62, 66 located at first 76 and second 78 ends of the first 60 and second 64 rows each include a third notch 80 (see FIG. 5) for receiving portions of the first 56 and second 58 stuffer end elements and the transverse portions 55.

The first 62 and 66 second clamp elements are each secured to the top portion 17 by a fastener assembly 82. The first 62 and 66 second clamp elements urge a corresponding portion of the first 52 and second 54 stuffer side elements and first 56 and second 58 stuffer end elements downward to compress a corresponding portion of the first 36 and second 38 side sections and the first 40 and second 42 end sections of the packing material 34. This provides an advantage over the prior art because it enables the compression of selected portions of the packing material 34, rather than the entire longitudinal length of the packing material 34, to stop any leakage of fluid occurring in that portion.

In addition, at least one jack screw 84 is threadably engaged with each of the first 62 and second 66 clamp elements. A bottom portion of each jack screw 84 contacts the top portion 17. Tightening of a jack screw 84 against the top portion 17 provides a reaction force for providing additional compressive force on a portion 36,38,40,42 of the packing material 34. A washer 86 may be located under each jack screw 84 to distribute the contact force against the top portion 17.

In particular, tightening of a selected fastener assembly 82 exerts pressure on an associated clamp element 62, 66 which then exerts pressure on a portion of a stuffer element 52, 54, 56, 58 thereby compressing a portion 36, 38, 40, 42 of the packing material 34 corresponding to the clamp element 62, 66 being tightened. Alternatively, loosening of a selected fastener 82 assembly causes an associated clamp element 62, 66 to decrease pressure on a portion of a stuffer element 52, 54, 56, 58 thereby decreasing pressure on a corresponding portion 36, 38, 40, 42 of the packing material 34.

As a result, over tightening of the packing material 34 is avoided by the current invention, as compared to when a single piece gland is used, thus increasing packing material life and not increasing valve thrust. Therefore, the current invention provides improved control of localized packing forces. Further, individual clamp elements may be removed without interfering without having to disassemble the actuator. In addition, the clamp elements are easier to manufacture and require less material than a single piece gland.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A packing gland for a valve, wherein the valve includes a top portion for receiving a gate, comprising:
    a first longitudinal section of packing material for sealing the gate;
    a second longitudinal section of packing material for sealing the gate;
    a first end section of packing material for sealing the gate;
    a second end section of packing material for sealing the gate;
    a first stuffer side element located adjacent the first longitudinal section;
    a second stuffer side element located adjacent the second longitudinal section;
    a first stuffer end element located adjacent the first end section;
    a second stuffer end element located adjacent the second end section;
    a plurality of first clamp elements located adjacent the first stuffer side element and the first stuffer end element, wherein the plurality of first clamp elements provide pressure on selected portions of the first stuffer side element and the first stuffer end element to compress corresponding selected portions of the first longitudinal section and the first end section of packing material; and
    a plurality of second clamp elements located adjacent the second stuffer side element and the second stuffer end element, wherein the plurality of second clamp elements provide pressure on selected portions of the second stuffer side element and the second stuffer end element to compress corresponding selected portions of the second longitudinal section and the second end section of packing material, wherein the first stuffer side element and the first stuffer end element are arranged between the plurality of first clamp elements and the first longitudinal section and the first end section of packing material, and wherein the second stuffer side element and the second stuffer end element are arranged between the plurality of second clamp elements and the second longitudinal section and the second end section of packing material.

2. The packing gland according to claim 1, further including at least one fastener assembly wherein the at least one fastener assembly secures each clamp element to the top portion.

3. The packing gland according to claim 2 further including at least one jack screw located adjacent to the at least one fastener assembly for providing pressure to the clamp elements.

4. The packing gland according to claim 1, further including a first spacer located between the first stuffer side element and the gate and a second spacer located between the second stuffer side element and the gate.

5. The packing gland according to claim 4, further including a first notch in one of the plurality of first clamp elements for receiving a portion of the first stuffer side element and first spacer and a second notch in one of the plurality of second clamp elements for receiving a portion of the second stuffer side element and a second spacer.

6. The packing gland of claim 5, further including a transverse portion fixedly attached to each axial end of the first and second stuffer side elements wherein the one of the plurality of first clamp elements and one of the plurality of second clamp elements includes a third notch for receiving portions of the first and second stuffer end elements and the transverse portions of the first and second stuffer side elements.

7. A knife gate valve, comprising:
a valve body having a top portion and a passageway for fluid;
a gate moveable between a closed position for closing the passageway and an open position for opening the passageway to enable fluid flow; and
a packing gland including,
a first longitudinal section of packing material for sealing the gate;
a second longitudinal section of packing material for sealing the gate;
a first end section of packing material for sealing the gate;
a second end section of packing material for sealing the gate;
a first stuffer side element located adjacent the first longitudinal section;
a second stuffer side element located adjacent the second longitudinal section;
a first stuffer end element located adjacent the first end section;
a second stuffer end element located adjacent the second end section;
a plurality of first clamp elements located adjacent the first stuffer side element and the first stuffer end element, wherein the plurality of first clamp elements provide pressure on selected portions of the first stuffer side element and the first stuffer end element to compress corresponding selected portions of the first longitudinal section and the first end section of packing material; and
a plurality of second clamp elements located adjacent the second stuffer side element and the second stuffer end element, wherein the plurality of second clamp elements provide pressure on selected portions of the second stuffer side element and the second stuffer end element to compress corresponding selected portions of the second longitudinal section and the second end section of packing material, wherein the first stuffer side element and the first stuffer end element are arranged between the plurality of first clamp elements and the first longitudinal section and the first end section of packing material, and wherein the second stuffer side element and the second stuffer end element are arranged between the plurality of second clamp elements and the second longitudinal section and the second end section of packing material.

8. The knife gate assembly according to claim 7, further including at least one fastener assembly wherein the at least one fastener assembly secures each clamp element to the top portion.

9. The knife gate valve according to claim 8, further including at least one jack screw located adjacent to the at least one fastener assembly for providing pressure to the clamp elements.

10. The knife gate valve according to claim 9, further including a first spacer located between the first stuffer side element and the gate and a second spacer located between the second stuffer side element and the gate.

11. The knife gate valve according to claim 10, further including a first notch in one of the plurality of first clamp elements for receiving a portion of the first stuffer side element and first spacer and a second notch in one of the plurality of second clamp elements for receiving a portion of the second stuffer side element and a second spacer.

12. The knife gate valve according to claim 11, further including a transverse portion fixedly attached to each axial end of the first and second stuffer side elements wherein the one of the plurality of first clamp elements and one of the plurality of second clamp elements includes a third notch for receiving portions of the first and second stuffer end elements and the transverse portions of the first and second stuffer side elements.

* * * * *